(12) United States Patent
Menger et al.

(10) Patent No.: US 12,415,467 B2
(45) Date of Patent: Sep. 16, 2025

(54) FASTENING ARRANGEMENT, MOTOR VEHICLE

(71) Applicant: Volkswagen Aktiengesellschaft, Wolfsburg (DE)

(72) Inventors: Ralf Menger, Braunschweig (DE); Steffen Kapune, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 243 days.

(21) Appl. No.: 18/099,961

(22) Filed: Jan. 22, 2023

(65) Prior Publication Data

US 2023/0158972 A1 May 25, 2023

Related U.S. Application Data

(63) Continuation of application No. PCT/EP2021/069960, filed on Jul. 16, 2021.

(30) Foreign Application Priority Data

Jul. 22, 2020 (DE) ...................... 10 2020 209 264.8

(51) Int. Cl.
*B60R 13/02* (2006.01)
(52) U.S. Cl.
CPC ...... *B60R 13/0206* (2013.01); *B60R 13/0212* (2013.01)
(58) Field of Classification Search
CPC ............ B60R 13/0206; B60R 13/0212; B60R 13/0225; B60R 13/0231
(Continued)

(56) References Cited

U.S. PATENT DOCUMENTS

| 4,505,611 A | 3/1985 | Nagashima et al. |
| 6,378,936 B1 | 4/2002 | Grimm et al. |

(Continued)

FOREIGN PATENT DOCUMENTS

| DE | 19947238 A1 | 4/2001 |
| DE | 102008052966 A1 | 4/2010 |

(Continued)

OTHER PUBLICATIONS

International Search Report dated Nov. 5, 2021 in corresponding application PCT/EP2021/069960.

(Continued)

*Primary Examiner* — Amy R Weisberg
*Assistant Examiner* — Denise Lynne Esquivel
(74) *Attorney, Agent, or Firm* — Muncy, Geissler, Olds & Lowe, P.C.

(57) ABSTRACT

A fastening arrangement for fastening a roof liner to a body roof, which has a frame opening, of a motor vehicle, with at least one fastening strip which is formed on the roof liner and extends parallel to a longitudinal or transverse side of the frame opening, with at least one elastically deformable clamping device, which is designed to lock the roof liner to the body roof in a form-fitting manner with a latching connector. It is provided that the clamping device has the latching connector, which is floatingly mounted on the roof liner, and that the latching connector, guided through an opening of the body roof, engages behind the body roof in a form-fitting manner.

9 Claims, 2 Drawing Sheets

(58) Field of Classification Search
USPC .......................................................... 296/214
See application file for complete search history.

(56) References Cited

U.S. PATENT DOCUMENTS

| | | | |
|---|---|---|---|
| 8,764,891 B1 | 7/2014 | Brown | |
| 8,899,671 B2* | 12/2014 | Huelke | ............... B60R 13/0231 |
| | | | 296/214 |
| 2009/0218464 A1 | 9/2009 | Kato et al. | |
| 2024/0116460 A1* | 4/2024 | Grobe | ................. B60R 13/0231 |

FOREIGN PATENT DOCUMENTS

| | | |
|---|---|---|
| DE | 102011106010 A1 | 1/2013 |
| DE | 102014100039 A1 | 7/2014 |
| EP | 3521641 A1 | 8/2019 |
| WO | WO0206071 A1 | 1/2002 |

OTHER PUBLICATIONS

International Preliminary Report on Patentability dated Feb. 2, 2023 in corresponding application PCT/EP2021/069960.

* cited by examiner

FASTENING ARRANGEMENT, MOTOR VEHICLE

This nonprovisional application is a continuation of International Application No. PCT/EP2021/069960, which was filed on Jul. 16, 2021, and which claims priority to German Patent Application No. 10 2020 209 264.8, which was filed in Germany on Jul. 22, 2020, and which are both herein incorporated by reference.

BACKGROUND OF THE INVENTION

Field of the Invention

The present invention relates to a fastening arrangement for fastening a roof liner to a motor vehicle body roof, which has a frame opening, with at least one fastening strip which is formed on the roof liner and extends parallel to a longitudinal or transverse side of the frame opening, and with at least one elastically deformable clamping device, which is designed to lock the roof liner to the body roof in a form-fitting manner with a latching connector. Furthermore, the invention relates to a motor vehicle with a body roof to which a roof liner is fastened by means of the above-mentioned fastening arrangement.

Description of the Background Art

Fastening arrangements are known from the prior art. For example, DE 10 2008 052 966 A1 discloses a fastening arrangement for vehicles, for fastening a molded headliner or roof liner to a panoramic roof or sunroof, which arrangement has at least one clamp body in the manner of a clip connector. Arranged on the roof liner is an elastically displaceable clamping element, which receives a latching projection projecting downwards from the body roof under elastic deformation and engages behind it in the mounted state. Another fastening arrangement is known from DE 10 2011 106 010 A1. EP 3 521 641 A1 and DE 10 2014 100 039 A1 (which corresponds to US 2014/0191540) also each disclose fastening arrangements with a clamping device which has a clip which is arranged on the headliner and which receives and engages behind a latching projection of the body roof under elastic deformation. A similar solution is also disclosed in DE 199 47 238 A1 (which corresponds to U.S. Pat. No. 6,378,936), wherein, there is shown that an elastically deformable clamping connector is formed here on the headliner, which connector is inserted into a receptacle of the body roof and is held there in a frictional or positive-locking manner.

SUMMARY OF THE INVENTION

It is therefore an object of the present invention to provide an improved fastening arrangement which enables simple mounting of the roof liner on the body roof and is inexpensive to manufacture and can easily compensate for manufacturing tolerances and/or assembly tolerances.

The object on which the invention is based is achieved by a fastening arrangement according to an exemplary embodiment and has the advantage that shape and manufacturing tolerances of the roof liner and body roof are compensated for in a simple manner during mounting and that the mounting is carried out by means of a simple plug-in connection, which in particular does not require any complex modification to the body roof. According to the invention, this is achieved in that the clamping device has a latching connector, which is floatingly mounted on the roof liner, and in that the latching connector, guided through an opening of the body roof, engages behind the body roof in a form-fitting manner. The invention thus provides that the latching connector is disposed on the roof liner and extends through an opening of the body roof to engage behind the body roof. As a result, only an opening for the latching connector, into which opening the latching connector can be inserted, has to be provided in the body roof. As a result, the manufacturing of the body roof is possible with little additional effort. In particular, this offers the advantage that, in the case of a body roof that has a body opening, for example, for a panoramic window or a sunroof, this can be taken into account in a simple manner in the design. Due to the fact that the latching connector is associated with the roof liner, mounting of the roof liner on the body roof is particularly easy, because the latching connector only has to be inserted into the body roof opening. This allows a simple mounting process to be carried out in a short time. The floating mounting of the latching connector on the roof liner also ensures that manufacturing or assembly tolerances can be easily compensated for when interconnecting the latching connector and the body roof. It is achieved thereby that the roof liner, for example, is not warped or subjected to undesirable mechanical stress during mounting.

The clamping device can have a support plate arranged or arrangeable on the roof liner, wherein the latching connector is floatingly mounted on the support plate. The latching connector is not fastened thereby directly to the roof liner, but to the roof liner with the interposition of the support plate. This has the advantage that the floating mounting of the latching connector is limited to the connection between the latching connector and the support plate. As a result, the floating mounting can be implemented with less effort compared to a solution in which the latching connector is mounted directly floating in the roof liner. In particular, this advantageous embodiment ensures that the performance of the floating mounting, therefore, the maximum relative movement path between the latching connector and the support plate, which is allowed by the floating mounting, can be advantageously adjusted. For example, the support plate is clamped, screwed, pressed to the roof liner, or held to it surrounded by the roof liner material. Optionally, the support plate is made of two parts, wherein one part is arranged on an upper side of the roof liner, said side facing the body roof, and the other part is arranged on the lower side of the roof liner, said side facing away from the body roof, and wherein the two parts are connected to one another through the roof liner by, for example, a plug connection, snap-in connection, or screw connection. In particular, the arranging of the latching connector for the floating mounting on the support plate in a preliminary preassembly step is easy to carry out by this type of two-part fabrication.

The latching connector can have a bearing base with a bearing plate, wherein the bearing plate is movably guided in a recess of the support plate. The floating mounting of the clamping device is thus realized by mounting the bearing plate in the support plate. Here, the bearing plate and the support plate define the maximum clearance, which is ensured by the floating mounting. In particular, the freedom of movement of the bearing plate in the support plate is limited in all directions, so that unwanted loosening of the latching connector from the support plate is reliably prevented in every case.

For example, the bearing plate can be mounted in the support plate so as to be movable in all directions in the plane of the bearing plate. Thereby, the bearing plate can be moved in the X- and Y-directions in particular or is held floating on the support plate. Particularly preferably, the bearing plate is mounted so as to be movable in all directions in the plane of the bearing plate, so that lateral movement of the latching connector on the support plate is ensured to a limited extent for floating mounting.

The bearing plate can also be mounted in the support plate so as to be movable perpendicular to the plane of the bearing plate, therefore, in the z-direction. As a result, the latching connector can be moved three-dimensionally on the support plate in order to compensate for tolerances in all directions. This reliably ensures that no mechanical stresses are transmitted to the roof liner, both during mounting and during subsequent operation of the motor vehicle, which could lead, for example, to damage to the roof liner or to folding or the like.

The latching connector can have at least one laterally projecting and elastically deformable or movable latching lug for engaging behind the body roof. The latching lug ensures that an unintentional detachment of the roof liner or latching connector from the body roof is reliably prevented. The latching lug moreover allows easy insertion and, in particular, self-centering of the latching connector on the roof liner, at least in one direction. As is customary, the latching lug expediently has an insertion bevel which acts in the direction of insertion, and which effects the centering of the latching connector during insertion into the opening in the body roof. On an underside facing away from the insertion bevel and in particular facing the support plate, the latching lug has a stop which is used for the form-fitting retention of the latching lug on the body roof.

The latching connector can have two latching lugs facing away from one another, the common maximum width of which is greater than the clear width of the opening in the body roof. As a result, the latching connector alone is already capable of preventing an unintentional detachment from the body roof. If there are multiple latching connectors, each with only one latching lug, this is also possible if the latching lugs are oriented differently, in particular, in order to prevent the roof liner from moving relative to the body roof in such a way that the latching connectors could detach from the body roof. Preferably, the latching lugs of the one latching connector are designed such that they are spaced apart from one another so that they can be moved towards one another when inserted into the opening and, after penetrating the opening, are moved away from one another again by the existing inherent elasticity in order to engage behind the body roof at the opening. In particular, the latching lugs are designed as spring tongues held at one end on the latching connector.

The body roof can have a retaining strip which is associated with the fastening strips of the roof liner and is arranged offset from the rest of the body roof by at least the height of the latching lug. This ensures that at least the latching lug or lugs which penetrate the retaining strip do not protrude beyond the rest of the body roof. The aforementioned openings for receiving a latching connector each are expediently formed in the retaining strip. Preferably, the retaining strip extends parallel to a longitudinal side or transverse side of the frame opening so as to enable the roof liner to be fastened close to the frame opening and thus, in particular, close to the sunroof and/or the panoramic roof.

The latching connector can be held in the opening in the body roof with lateral play in at least one direction, in particular at least perpendicular to the spring direction of the at least one latching lug, so that tolerance compensation also takes place there and simple mounting is ensured.

The fastening arrangement can have a plurality of frame openings and associated latching connectors by which the roof liner is fastened to the body roof. In particular, the openings at the edge of the frame opening in the body roof can be arranged in an evenly distributed manner in this case, in order to advantageously fasten the roof liner to the body roof in the region of the frame opening.

The roof liner can have a frame edge section in which the respective latching connector is floatingly mounted directly. The roof liner frame, for example, is made of plastic and molded to the roof liner. For locking the respective latching connector to the frame edge section, there is then advantageously a cover part for each latching lug, which cover part can be fastened to the frame, in particular by clipping or in some other way, in order to lock the latching connector, in particular at its base, preferably at the bearing plate, to the frame edge section, with the formation of the floating mounting. It is provided in particular that one part of the support plate as described above is formed by the frame edge section, and the other part is formed by the cover section.

The motor vehicle of the invention is characterized by the fastening arrangement of the invention. This results in the aforementioned advantages. Further advantages and preferred features and combinations of features emerge from what has already been described and from the claims.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
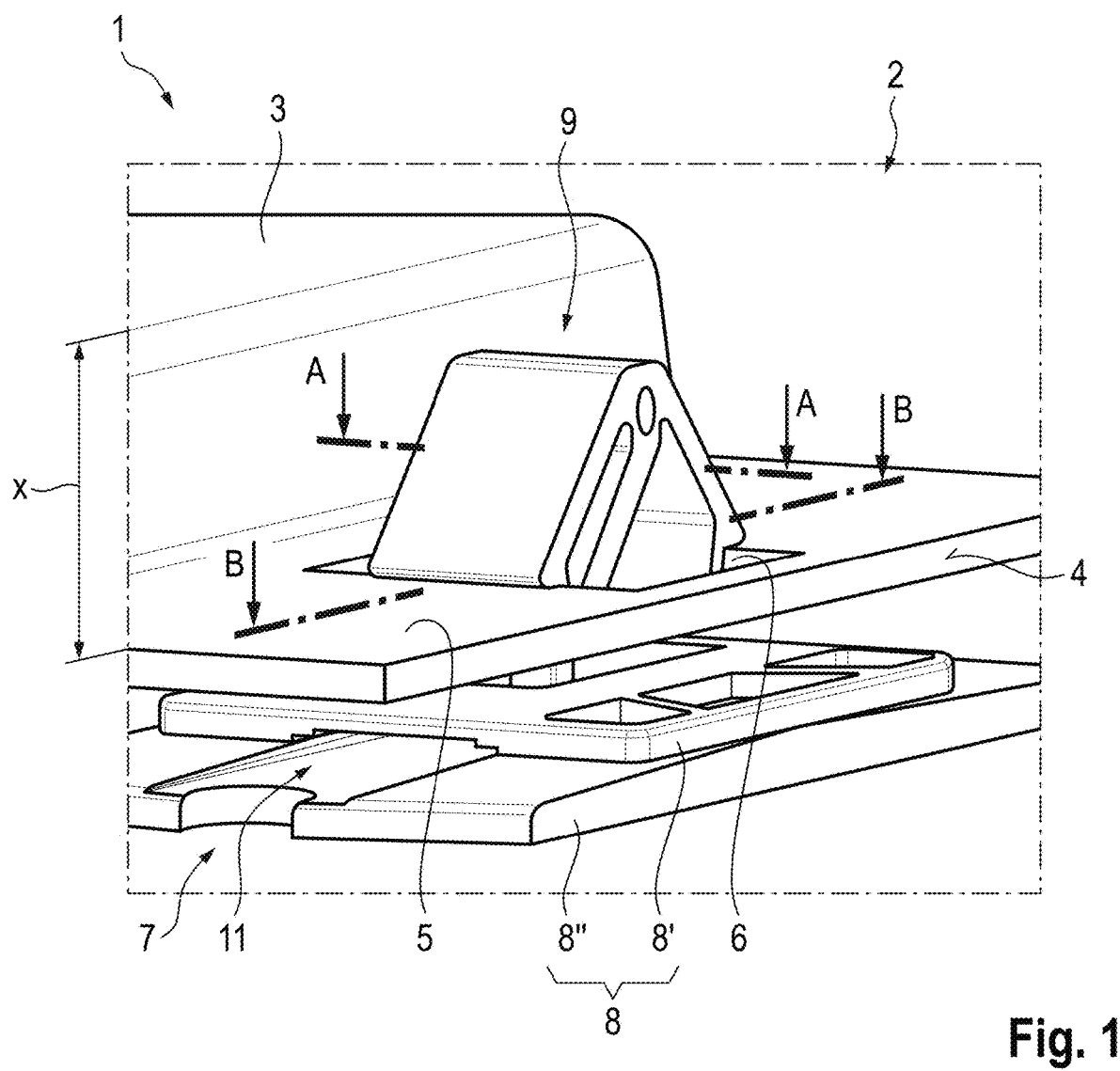
FIG. 1 shows an advantageous fastening arrangement in a three-dimensional representation.

FIG. 1 shows a perspective representation of an advantageous fastening arrangement 1 for a motor vehicle 2. Fastening arrangement 1 comprises a body roof 3 of the motor vehicle, which is part of the body shell of the motor vehicle, for example. Body roof 3, which is shown only partially in FIG. 1, ends at a frame opening 4, which is formed, for example, in a rectangular shape in body roof 3. For example, a panoramic roof or a sunroof of the motor vehicle can be mounted in the frame opening, as shown by way of example in FIG. 2B. Body roof 3 has an edge section which forms or surrounds said frame opening 4 and is formed by a retaining strip 5 which is arranged offset in height by an amount x relative to the rest of body roof 3. Retaining strip 5 preferably extends over the entire frame opening 4 and forms its edge. A plurality of openings 6, which have a rectangular contour according to the present exemplary embodiment, are formed in retaining strip 5. The particular opening extends completely through retaining section 5, so that it can also be referred to as a through-hole.

Fastening arrangement 1 further has a clamping device 7 associated with the shown opening 6. Preferably, fastening arrangement 1 has a corresponding clamping device 7 for each opening 6.

Clamping device 7 has a support plate 8 on which a latching connector 9 is floatingly mounted. This will be explained in more detail with the aid of FIG. 2.

Figure 2A:
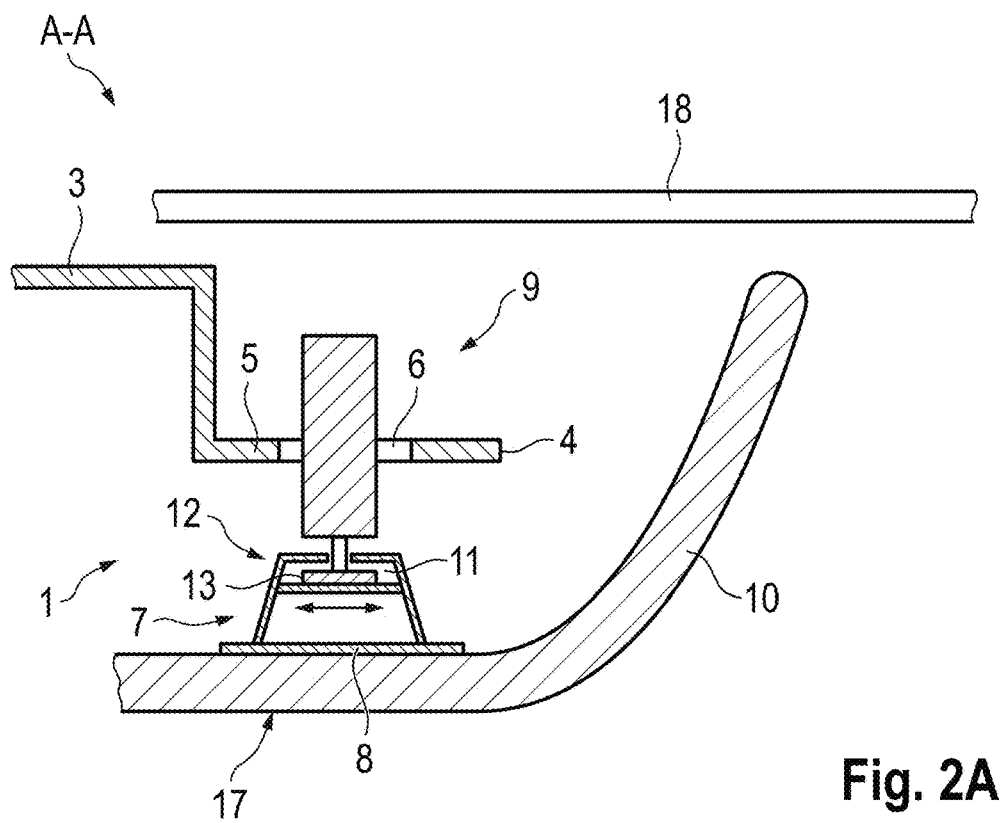
FIGS. 2A and 2B show sectional views of the fastening arrangement.
Figure 2B:
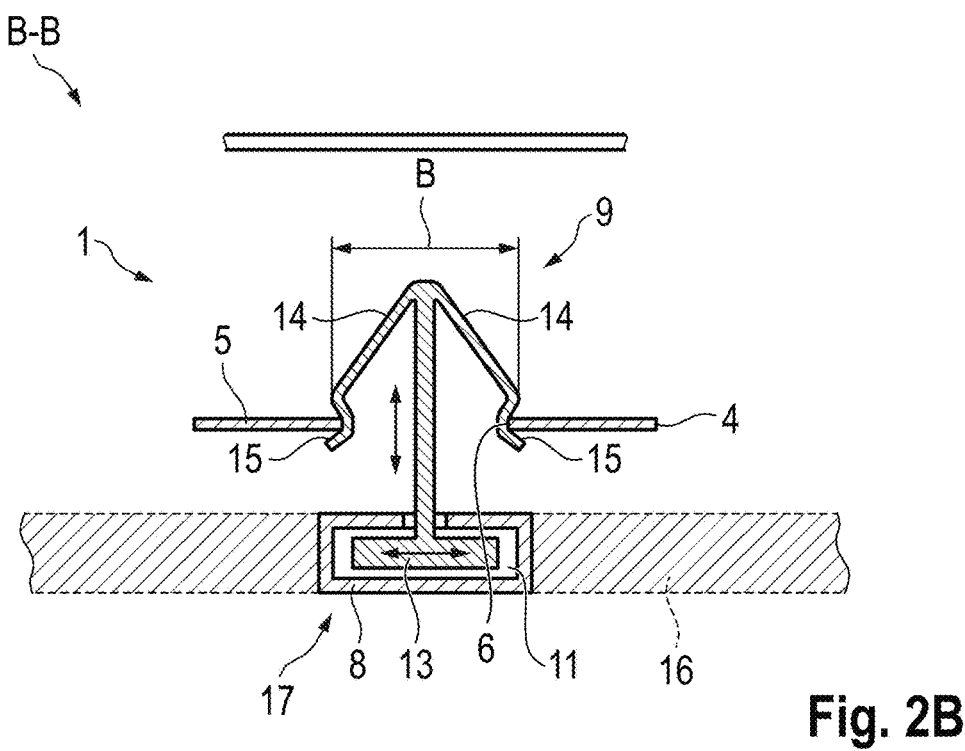

FIGS. 2A and 2B each show a sectional view through the advantageous fastening arrangement, wherein FIG. 2A shows a longitudinal section along line A-A in FIG. 1 and FIG. 2B shows a cross-sectional view in a plane perpendicular thereto along line B-B in FIG. 1.

By way of example, a roof liner 10 fastened to body roof 3 by fastening arrangement 1 and, by way of example, a panoramic glass roof 18 covering frame opening 4 are shown in addition in the sectional view in FIG. 2A.

Clamping device 7 is fastened to a fastening strip 17 of roof liner 10, on the upper side facing body roof 3 with support plate 8. Fastening strip 17 extends here parallel to retaining strip 5 of body roof 3. Latching connector 9 is movable in a recess 11 of support plate 8 and thus floatingly mounted. For this purpose, latching connector 9 has a base 12 with a bearing plate 13. Bearing plate 13 extends in a plane perpendicular to the longitudinal extension of latching connector 9 or perpendicular to its joining direction, and has a rectangular contour, for example. Advantageously, recess 11 also has a rectangular contour so that bearing plate 13 is movable in recess 11 in the plane in which bearing plate 13 extends, as shown by the double arrows in FIGS. 2A and 2B.

In addition, recess 11 has a height that is greater than the height of bearing plate 13, so that latching connector 9 not only mounted with lateral play or floatingly, but also vertically, so that latching connector 9 is mounted in a three-dimensional floating manner, as shown by the arrows in FIGS. 2A and 2B.

For this purpose, support plate 8 is preferably made of plastic and optionally formed in one piece and created around the bearing plate in an injection molding process, for example. Alternatively, support plate 8 is made in two parts, with a first part 8' and a second part 8", as shown by way of example in FIG. 1. Parts 8' and 8" together form recess 11. The two-part design ensures easy mounting of latching connector 9 on support plate 8.

As best seen in FIGS. 2B and 1, latching connector 9 has two latching lugs 14 which face away from one another and are formed at an end of latching connector 9, said end facing away from bearing plate 13, and extend toward bearing plate 13 in the manner of spring tongues such that the distance between latching lugs 14 increases. In this case, the maximum width B of latching lugs 14 or of latching connector 9 is greater than the clear width of opening 6 through which latching connector 9 with latching lugs 14 is guided. According to the present exemplary embodiment, latching lugs 14 each have a receiving recess 15 at their end facing bearing plate 13, which recess is used for the sectional receiving of the edge of retaining section 5, said edge surrounding opening 6. Latching lugs 14 are formed to be elastically deformable, so that when latching connector 9 is first inserted into opening 6 with latching lugs 14, and latching lugs 14 are moved toward each other under elastic deformation, the width of latching connector 9 is reduced and passing through or insertion into opening 6 is ensured. Due to their inherent elasticity, latching lugs 14 snap outward again as soon as receiving recesses 15 have reached retaining section 5, so that retaining section 5 is thereby connected to latching connector 9 in a form-fitting manner. Unintentional pulling out or falling out of latching connector 9 from the respective opening 6 is thus reliably prevented.

As an alternative to the exemplary embodiment shown, it is provided according to a further exemplary embodiment that latching lugs 14 are formed without the receiving recesses and are passed completely through opening 6 and reach their relaxed initial position after being passed through and thus lie completely behind retaining section 5. A reliable connection is then also ensured, but it is more difficult to release the connection. The embodiment shown in FIGS. 2A and 2B has the advantage that, because the free ends of latching lugs 14 are on the side, facing roof liner 10, of retaining section 5, latching lugs 14 can also be moved towards one another by a suitable tool to enable latching connector 9 to be released from retaining section 5 or body roof 3.

Preferably, latching lugs 14 are formed integrally with latching connector 9, in particular integrally with bearing plate 13, so that latching connector 9 is an overall compact component that is easy to handle. The preferred preassembly of latching connector 9 on support plate 8 further ensures that fastening arrangement 1 can be mounted with few manipulations.

Whereas according to the present exemplary embodiment, support plate 8 is fastened to roof liner 10, according to a further exemplary embodiment, it is provided that support plate 8 is formed by a frame edge section 16 of roof liner 10. To this end, FIG. 2B shows with dashed lines by way of an example frame edge section 16 of roof liner 10, which integrally forms recess 11. As a result, a separate support plate for each latching connector 9 can be dispensed with. Instead, recesses 11 or support plates 8 are formed integrated into roof liner 10. In particular, frame edge section 16 is formed by fastening strip 17 of roof liner 10.

The multi-part design of support plate 8 has the advantage that the two parts 8' and 8" can also be mounted on two sides of roof liner 10, for example, and are connected to one another by roof liner 10, so that the support plates are fastened to roof liner 10 in this way and receive bearing plate 13 of latching connector 9 between them.

Optionally, the support plate or plates 8 are held on roof liner 10 by sewing, gluing, welding, or overmolding with a material particularly of edge section 16.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fastening arrangement to fasten a roof liner to a body roof, which has a frame opening, of a motor vehicle, the fastening arrangement comprising:

at least one fastening strip arranged on the roof liner and extending substantially parallel to a longitudinal or transverse side of the frame opening; and at least one elastically deformable clamping device that includes a latching connector, the at least one clamping device being designed to lock the roof liner to the body roof in a form-fitting manner with the latching connector, wherein the latching connector is floatingly mounted on the roof liner, wherein the latching connector, which is guided through an opening of the body roof, engages behind the body roof in a form-fitting manner, wherein the latching connector has two laterally projecting and elastically deformable or movable latching lugs for engaging behind the body roof, wherein the two latching lugs face away from one another, wherein a combined maximum width of the two latching lugs is greater than a clear width of the opening in the body roof, wherein the two latching lugs are designed as spring tongues that extend from one end of the latching connector, and wherein the latching connector is held in the opening with lateral play in at least one direction perpendicular to a spring direction of the two latching lugs.

2. The fastening arrangement according to claim 1, wherein the at least one clamping device has a support plate arranged or arrangeable on the roof liner, and wherein the latching connector is floatingly mounted on the support plate.

3. The fastening arrangement according to claim 2, wherein the latching connector has a bearing base with a bearing plate, and wherein the bearing plate is movably mounted in a recess of the support plate.

4. The fastening arrangement according to claim 3, wherein the bearing plate is mounted in the support plate so as to be movable in all directions in the plane of the bearing plate.

5. The fastening arrangement according to claim 3, wherein the bearing plate is mounted in the support plate so as to be movable perpendicular to the plane of the bearing plate.

6. The fastening arrangement according to claim 1, wherein the body roof has a retaining strip that opposes the fastening strip, and wherein the retaining strip is arranged offset from the rest of the body roof essentially by a height of the two latching lugs.

7. The fastening arrangement according to claim 1, wherein the fastening arrangement has a plurality of frame openings and associated latching connectors by which the roof liner is fastened to the body roof.

8. The fastening arrangement according to claim 1, wherein the roof liner has a frame edge section in which the latching connector is floatingly mounted directly.

9. A motor vehicle comprising a body roof which has a frame opening for receiving a panoramic roof or a sunroof, wherein a roof liner is fastened to the body roof by the fastening arrangement according to claim 1.

* * * * *